Patented Mar. 24, 1931

1,797,572

UNITED STATES PATENT OFFICE

HARRY R. FULTON AND JOHN J. BOWMAN, OF WASHINGTON, DISTRICT OF COLUMBIA

PROCESS FOR THE TREATMENT OF FRUIT FOR THE PREVENTION OF DECAY

No Drawing.  Application filed November 19, 1927. Serial No. 234,543.

(GRANTED UNDER THE ACT OF MARCH 3, 1883; 22 STAT. L. 625.)

This application is made under the act of March 3, 1883, chapter 143, (22 Stat. 625) and the invention herein described and claimed may be used by the Government of the United States or any of its officers or employees in the prosecution of work for the Government, or any persons in the United States, without payment to us of any royalty thereon.

This invention consists of a process of treating fresh fruit, particularly citrus fruit, with an aqueous solution of sodium aluminate, to prevent stem-end rot and decay caused by green and blue molds and other organisms. Effective control of rots may be obtained by using sodium aluminate in concentrations ranging from about one per cent to about five per cent by weight of solution. In place of the chemically pure salt it has been found that the ordinary technical or commercial grades of this material can be substituted when proper allowance is made for their degree of purity.

Treatment with this material controls stem-end rot caused by *Phomopsis citri* and *Diplodia natalensis*, as well as other decays such as blue-mold rot caused by *Penicillium italicum* and green-mold rot caused by *Penicillium digitatum*.

We do not desire to limit the temperature of the treating solution to any set temperature as various degrees from 60° F. upward have proved effective. However, temperatures approaching 130° F. are injurious to fresh citrus fruits if exposure is at all prolonged. The time required for treatment with this fungicide necessary to prevent decay caused by these fungi depends to some extent upon the age and condition of the fruit. For young and vigorous fruit, a thorough wetting of the rind, which can be done in less than one minute, is sufficient to give effective control, while overripe fruit may require as much as ten minutes treatment to render the tissue of the rind resistant to the fungi.

We do not limit the strength of solution strictly to the proportion stated, but in general practice it has been found useful to employ a concentration within the stated range. For practical purposes we prefer to use sodium aluminate in a 3 per cent solution by weight.

The treatment above described is accomplished by spraying, submerging, immersing, or causing the fruit to pass through a receptacle or tank containing the solution, in such a manner that the entire surface of the fruit is wet with the solution. The apparatus described by Barger, Hukill and Hawkins in the United States Patent No. 1,599,733 may be used for this purpose, or the machinery in ordinary use for washing fruit in citrus fruit packing houses may be used with or without simple adaptations.

The treating solution may be applied to the fruit immediately prior to the time of washing the fruit, during the washing process, following the washing process, or as a treatment on clean fruit without other washing.

In some cases it may be advisable to spray such fruit after it leaves the treating solution with water, or with a relatively weak solution of the sodium aluminate to dilute or remove the excess solution on the surface of the rind.

We claim:

1. A process for treating fresh fruits and vegetables with an aqueous solution of sodium aluminate in strength sufficient to control blue-mold rot, stem-end rot and other forms of decay.

2. A process of treating fresh fruit, especially citrus fruit, with a solution of sodium aluminate in proportions of 1 part by weight to 100 parts solution up to 1 part by weight to 20 parts solution, said solution being adapted to prevent decay in such fruit caused by *Phomopsis citri*, *Diplodia natalensis*, *Penicillium italicum*, and *Penicillium digitatum*.

3. A process of treating citrus fruit with an aqueous solution of sodium aluminate containing approximately three per cent by weight of sodium aluminate at a temperature of not less than 60° F., to prevent green and blue mold decay and stem-end rot in such fruit.

4. A process of treating fresh fruit, especially citrus fruit, with an aqueous solution of sodium aluminate at temperatures below 130° F., at a concentration and for a period sufficient to cause the fruit to become thoroughly wet with the solution, to prevent stem-end rot and blue-mold and green-mold decay of such fruit.

5. A process of treating citrus fruit for the prevention of stem-end rot and blue-mold rot or other forms of decay with an aqueous solution of sodium aluminate of sufficient strength to effectively retard the development of said forms of decay, at temperatures commonly used for washing fruit, causing the fruit to remain in contact with the solution from one to ten minutes, and further spraying the fruit after it leaves the treating solution to remove a large part or substantially all of said solution from the surface of the fruit.

6. In the preparation of fresh fruit for market a process which comprises subjecting the fruit to the action of an aqueous solution of sodium aluminate and the subsequent removal of a large part or substantially all of said solution from the surface of the fruit.

7. A method for the prevention of decay of fruits and vegetables consisting in the treatment of such articles with a solution comprising sodium aluminate.

HARRY R. FULTON.
JOHN J. BOWMAN.